(12) United States Patent
Tönnby et al.

(10) Patent No.: US 6,320,857 B1
(45) Date of Patent: *Nov. 20, 2001

(54) TELEPHONE DOUBLER ARRANGEMENT

(75) Inventors: Ingmar Tönnby; Allan Hansson, both of Stockholm (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/868,649

(22) Filed: Jun. 4, 1997

(30) Foreign Application Priority Data

Jun. 4, 1996 (SE) .................................. 9602212

(51) Int. Cl.⁷ ................................... H04L 12/66
(52) U.S. Cl. .......................... 370/352; 379/88.1
(58) Field of Search .................. 370/352, 365, 370/389, 392, 485; 379/201, 213, 216, 210, 230, 88.1, 93.01, 88.17

(56) References Cited

U.S. PATENT DOCUMENTS

| | | |
|---|---|---|
| 5,604,737 | 2/1997 | Iwami et al. |
| 5,805,587 * | 9/1998 | Norris et al. .................... 370/352 |
| 5,809,128 | 9/1998 | McMullin ....................... 379/215 |

FOREIGN PATENT DOCUMENTS

| | | |
|---|---|---|
| 6-217032 | 8/1994 | (JP) . |
| 717 0288 | 7/1995 | (JP) . |
| WO96/03829 | 2/1996 | (WO) . |
| 97/26749 | 7/1997 | (WO) . |

* cited by examiner

Primary Examiner—Jessica J. Harrison
Assistant Examiner—Kim T. Nguyen
(74) Attorney, Agent, or Firm—Burns, Doane, Swecker & Mathis L.L.P.

(57) ABSTRACT

A method and a device for providing a telephone service to a subscriber which over a computer and a modem has an ongoing Internet session with a an Internet access server over an IP link established over a connection in the telephony network. A telephony application allowing for voice transmission over the IP connection is running on the computer. A telephony server has access to the public network and to the Internet access server. Upon start up of the telephony application the telephony server requests forwarding of calls to the subscriber's own telephone number to go to the telephony server from which they are transported over the IP access server to the subscriber's computer. Speech is transported as compressed audio.

30 Claims, 3 Drawing Sheets

TELEPHONE DOUBLER ARRANGEMENT

TECHNICAL FIELD OF THE INVENTION

The present invention relates to telecommunication in general and to voice communication over the Internet in particular.

BACKGROUND

The TCP/IP protocol, sometimes referred to as the 'Internet protocol', was developed as a standard protocol to allow different types of computers to exchange electronic mail and other files over a network. The network using this protocol is known as the 'Internet' and has grown from its beginning when it linked military and educational sites in the USA to become world- wide.

A new IEEE standard referred to as isoEthernet allows up to 96 two way voice channels to be present on a standard 10BaseT Ethernet network without affecting any of the normal ethernet traffic. The isoEthernet technology keeps packet data and realtime information separated so voice and video are unaffected by data traffic and vice versa.

The use of Internet for telephony is known and requires a sound card mounted in a PC (personal computer), a microphone and a pair of speakers connected to the sound card, and a telephony application (software) that recognizes the sound card. Bidirectional voice communication is possible between two telephony applications.

The use of a LAN for telephony is known and requires a telephony application running under WINDOWS on a PC which is connected to a LAN (Local Area Network) or an ATM-LAN (Asynchronous Transfer Mode). The user can make and receive telephone calls to/from another PC or the public ISDN (Integrated Services Digital Network), PSTN (Public Switched Telephone Network) or mobile networks. Access between a private LAN and a public telephony network is provided by a gateway.

RELATED TECHNIQUE

When a computer is connected to the Internet via a modem and a subscriber line of the PSTN, it is not possible to place outgoing calls or to take incoming calls on the line to which the modem is connected.

This situation is also present when Internet is used for telephony using the above described known technique with a PC connected to the Internet via a modem, a PC mounted sound card and a telephony application. The Internet user's ordinary home telephone is blocked. An incoming call meets a busy tone and no outgoing call can be placed.

A caller that dials, in the PSTN or the ISDN, the telephone number associated with the modem line on which an Internet session is taking place will hear a busy tone. Conversely, it is not possible to place outgoing phone calls on a line to which a modem is connected when the modem is engaged in an ongoing Internet session.

Typically an Internet session is started by having the computer dial the telephone number to an Internet gate way. A PPP (point-to-point protocol) connection or a SLIP (serial line Internet protocol) connection is established between the computer's modem and the Internet gateway when the Internet gateway answers the call. The telephone line is used for this connection. A person operating the computer starts an Internet session by running an Internet application such as NETSCAPE. A session may comprise sending e-mail, downloading a file, participate in a discussion by exchanging information in writing, 'surfing on the net' and many other activities. During a session digital data is exchanged over the line using the standard TCP/IP protocol (transmission control protocol and Internet protocol). Information is exchanged between the computer and the Internet in form of packets.

In a household an ongoing Internet session presents a problem. Members of the family cannot place outgoing calls when the line is occupied by the computer engaged in the Internet session. During an Internet session the line will be marked as occupied when there is an incoming call to the family.

An obvious solution to the above problem is to provide a separate telephone line for the computer. In view of the subscription costs for a line this solution is less feasible.

Japan Patent Abstract JP-7-170 288 (U.S. Pat. Ser. No. 5,604,737) relates to a communication system comprising a local area network (LAN) and a communication server connected to the LAN and to a public switched telephone network (PSTN) over an access line to a central office. The communication server allows establishment of telephone calls between communication terminals on the LAN and between communication terminals connected to the LAN and telephones in the PSTN or in a local telephone network connected to the communication server.

In the LAN each communication terminal is identified by a unique statically determined adress. To handle telephone calls a communication terminal is also associated with a telephone number. This association is a static relation, stored in the communication server. The telephone numbers of the communication terminals connected to the LAN are in the PSTN statically attributed to the communication server, which acts as a Private Branch Exchange (PBX), forwarding incoming calls to the communication terminal associated with the called extension number of an incoming call.

The present invention differs from the Japanese Patent Abstract in that the present invention does not use a LAN but a dialed up connection. The telephony server is located at the modem pool and not at the user. Temporary relations are used, both as regards the relation telephone number/IP adress as well as the telephone number relation established while a call forwarding service is active.

SUMMARY

One object of the present invention is to provide a method allowing a subscriber, engaged in an ongoing Internet session over an IP (Internet Protocol) link that uses a telephone line, to place an outgoing call over the telephone line without disrupting the Internet session.

Another object of the present invention is to provide a method allowing a subscriber, engaged in an ongoing Internet session over an IP link that uses a telephone line, to take an incoming call that as destination has the telephone number associated with the occupied line without disrupting the Internet session.

Still another object of the invention is to afford a mobile Internet user access to the user's own home telephone. In particular the user shall be able to place and to take calls from/to the home telephone while engaged in an Internet session over a line of another telephone. In other words the user shall be able to start an Internet session from any selected telephone in the telephone network and to be able to take calls, which as destination has the telephone number of the user's home telephone, while engaged in an Internet session on the telephone line of said selected telephone, thus enabling placed calls to be charged to the user's own subscription.

The method in accordance with the invention is to redirect, also referred to as call forwarding or call transfer, a call to a subscriber engaged in an Internet session, to a telephony server connected to the Internet gateway. In the telephony server the speech of the calling party is compressed and packetized. From the telephony server an IP link is established to the user via the Internet gateway. Over this IP link compressed and packetized speech is transferred.

In accordance with the invention the telephony application, running on the PC having the IP session, in collaboration with the telephony server activates and deactivates the call forwarding service.

As mentioned above the telephone number to which incoming calls to a subscriber engaged in an Internet session are forwarded to the telephony server.

In accordance with another embodiment of the invention the user, when accessing the telephony server, is subjected to an authentication process the purpose of which is to verify the identity of a user. An authorized user is allowed to activate call forwarding a non-authorized user not. An authorized user will have calls, which are directed to the user's home telephone number, forwarded to the current location at which the user is having the Internet session. In this manner the user is given mobility.

A further advantage achieved by the present invention is that the telephony service can be implemented with no or minimal changes to the existing telephony networks. Telephony service providers offering the service in accordance with the invention can integrate the inventive service nicely with a user's normal subscription.

BRIEF DESCRIPTION OF THE DRAWINGS

The invention and its merits will be described in connection with the accompanying drawings, wherein.

DETAILED DESCRIPTION OF EMBODIMENTS

Figure 1:
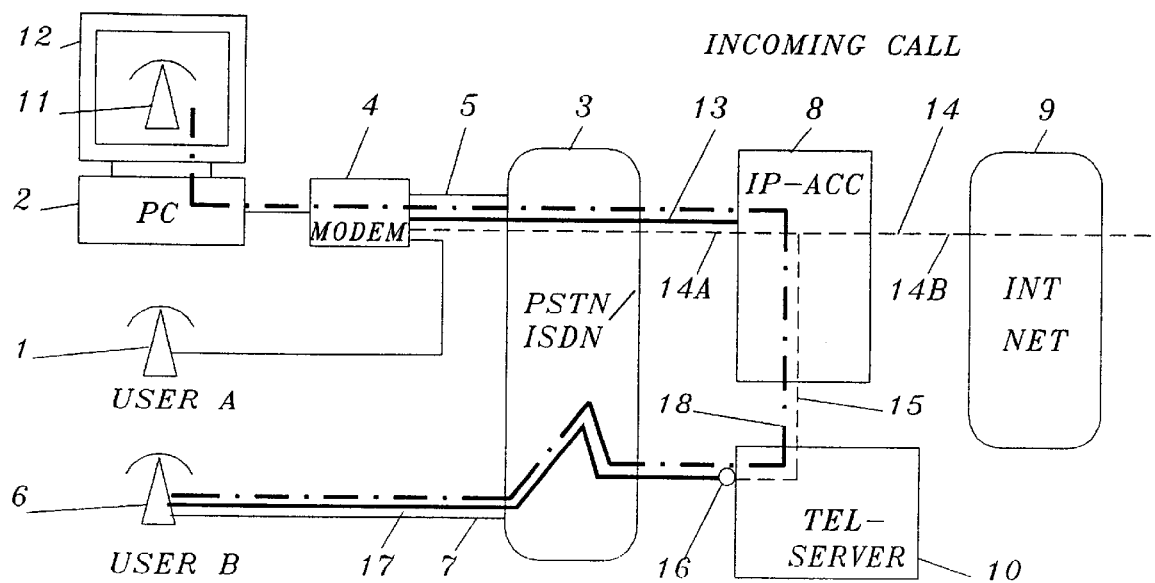
FIG. 1 is a block diagram of entities involved in an Internet session; among these a telephony server in accordance with the present invention; the telephony server handling an incoming call to an Internet user from a telephone user.

In FIG. 1 a user A has a telephone 1 and a personal computer 2 connected to the public switched telephone network (PSTN) 3 via a modem 4 and a subscriber line 5. Another user B has a telephone 6 connected to PSTN 6 via another subscriber line 7.

In FIG. 1 there is also shown an Internet access server 8, in the following referred to as an IP access server, which is connected to PSTN and to the Internet 9. The IP access server acts as an Internet gateway between the PSTN and the Internet. A telephony server 10 in accordance with the invention is connected to the Internet access server 8 and to PSTN 3 and provides a telephony service to users of the Internet.

The personal computer is provided with sound capabilities and has a microphone and a speaker connected. In FIG. 1 a telephony application 11 is shown by the telephone symbol 11 at the screen of the computer's monitor 12.

The telephony application is software that runs on the PC and that operates on the Internet, on the PSTN and on the sound card and its attached speaker and microphone. The telephony application allows bidirectional voice communication over the sound card and its attached microphone and speaker. The telephony application in conjunction with the computer's sound capabilities can transform electrical voice signals from the microphone into digitized and compressed audio signals that are packetized and supplied to the modem and can conversely transform packets containing digitized compressed audio signals into analogue electrical signals which are supplied to the speaker. For example the sound capabilities of the computer are realized by sound card connected to a serial port of the computer. The audio signals of the sound card are processed by the computer and are exchanged with the modem via the IP protocol driver programs and the serial port to which the modem is attached. The modem, in its turn, is connected to the subscriber line 5.

The telephony server 10 is co-located with the IP access server and is generally independent of the IP access server. Its physical connections with the PSTN and the IP access server are not shown in FIG. 1 for the sake of clarity. As an example the telephony server is connected to the IP access server via a non shown LAN, and to the PSTN/ISDN via an ISDN or PABX line interface. Over the connections between the telephony server and the IP access server speech and data information is transported using the IP protocol. Over the connections between the telephony server and the PSTN speech to and from users is transferred and signalling to and from the PSTN takes place.

For the moment it is assumed the user telephony application is not running on the computer.

Application start up

In FIG. 1 user A has set up a PSTN connection 13 to the IP access server using an Internet application (not shown) running on the computer 2. The IP access server gives a unique IP address to user A's computer. While the Internet session is active the modem will block user A's telephone 1. The telephone can therefore not access PSTN. On the PSTN connection 13 packets organized in accordance with the IP protocol, in the following referred to as IP packets, are sent to and from the IP access server and from there out to Internet following the horizontal path indicated by the dashed line 14. Dashed line 14 is in the following referred to as an IP link. For illustration purposes only the IP link 14 is shown to have a first section 14A between the modem and the IP access server and a second section 14B from the IP access server to the Internet. In reality it is not possible to distinguish the first and second sections of the IP link 14.

Accordingly the horizontal dashed line 14 in FIG. 1 represents user A's Internet connection.

User A is thus having an Internet session and user A's subscriber line is marked "busy" at the local switching office (not shown) in the PSTN. Conventionally and prior to the present application user B, when placing a call to A, would meet a busy tone.

In accordance with the present invention user A starts the telephony application 11. Next the telephony application logs on to the telephony server. To this end the telephony application establishes an IP link 14A, 15 to the telephony server 10. The IP link 15 is using any of the connections (not shown) between the IP access server and the telephony server. When the telephony application logs on to the telephony server it passes user A's telephone number as well as the IP adress of user A's computer to the telephony server. The telephony server now establishes a temporary relation between user A's telephony number and the IP-adress of user A's computer. The temporary relation will last for the duration of the telephony application session and is released when the telephony application session ceases.

Finally the telephony server activates, in the PSTN and on behalf of user A, the service "call forwarding" and indicates as call forwarding number the unique telephone number of the telephony server. Calls to user A's telephone number will, in accordance with the invention, be routed in the PSTN to the telephony server.

Incoming call

Figure 6:
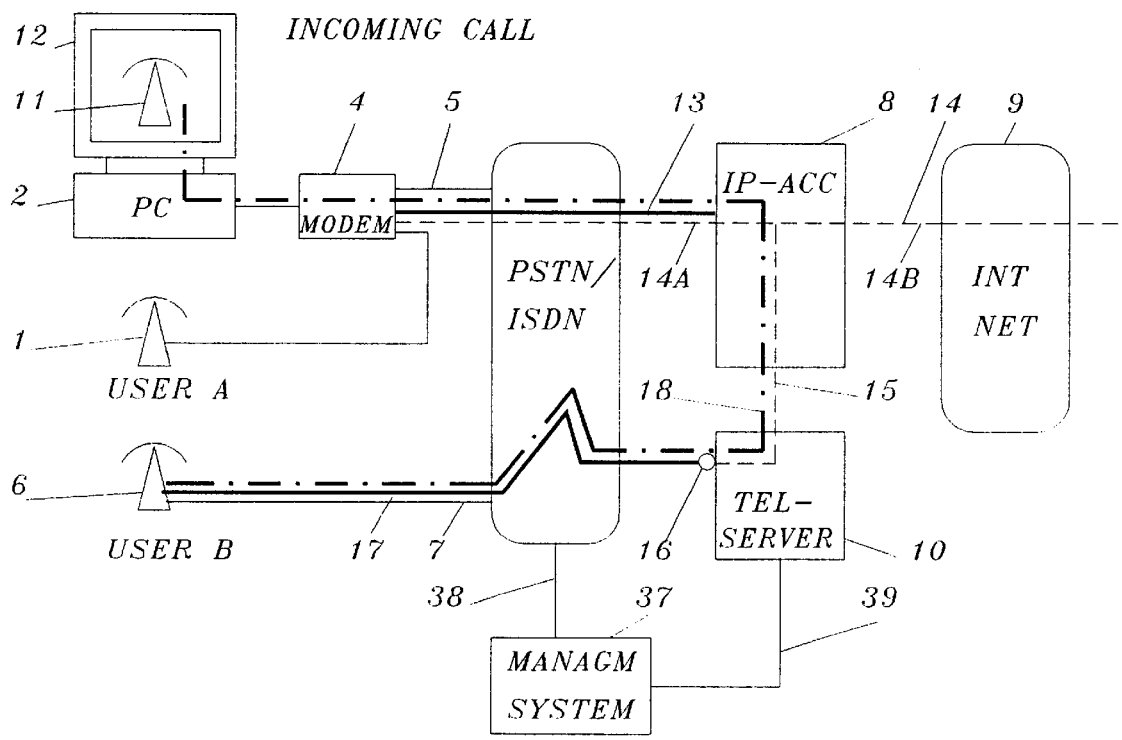
FIG. 6 is a block diagram similar to that of FIG. 1 showing a management system providing the service remote controlled call forwarding.

User B wants to speak with user A over the telephone and dials the telephone number to user A. PSTN detects that calls to A should be forwarded to the forwarding number and therefore redirects the call to the telephony server. The telephony server receives an incoming call at a port 16. Accordingly a PSTN connection 17 is established to the telephony server. Next the telephony server, based upon the temporary relation between user A's telephone number and the IP adress of user A's computer, creates a relation between the incoming call and the IP address of user A's computer. This relation is referred to as the second relation and is different from the previously mentioned temporary relation. Various methods to this are described below in connection with FIG. 6. Next the telephony server alerts user A of the incoming call by sending an alert message over the IP link 15. The alert message is formatted in accordance with the TCP/IP protocol.

Depending on the facilities available at user A, user A may now decide to (a) take the call or (b) request the telephony server to redirect the call to a call handler or (c) reject the call.

In alternative (a) user A sends a request, over the IP packet paths 14*a*, 15, to the telephony server to take the call. The request is sent by the telephony application. The telephony server connects port 16 with a voice compression and packetizing device, shown in FIG. 5, which digitizes, compresses and packetizes B's speech and sends it over the IP packet paths 15, 14A to user A. Without disrupting the Internet session user A can now speak with user B over the IP packet paths 14*a*, 15 and the PSTN connection 17 using the telephony application 11. The voice path is indicated by the heavy dash dot line 18. Eventually the call is terminated. User A has thus got a soft phone for communication with PSTN over an IP path. The soft phone comprises the telephony application 11, the microphone, the speaker and the PC's sound capabilities.

Figure 2:
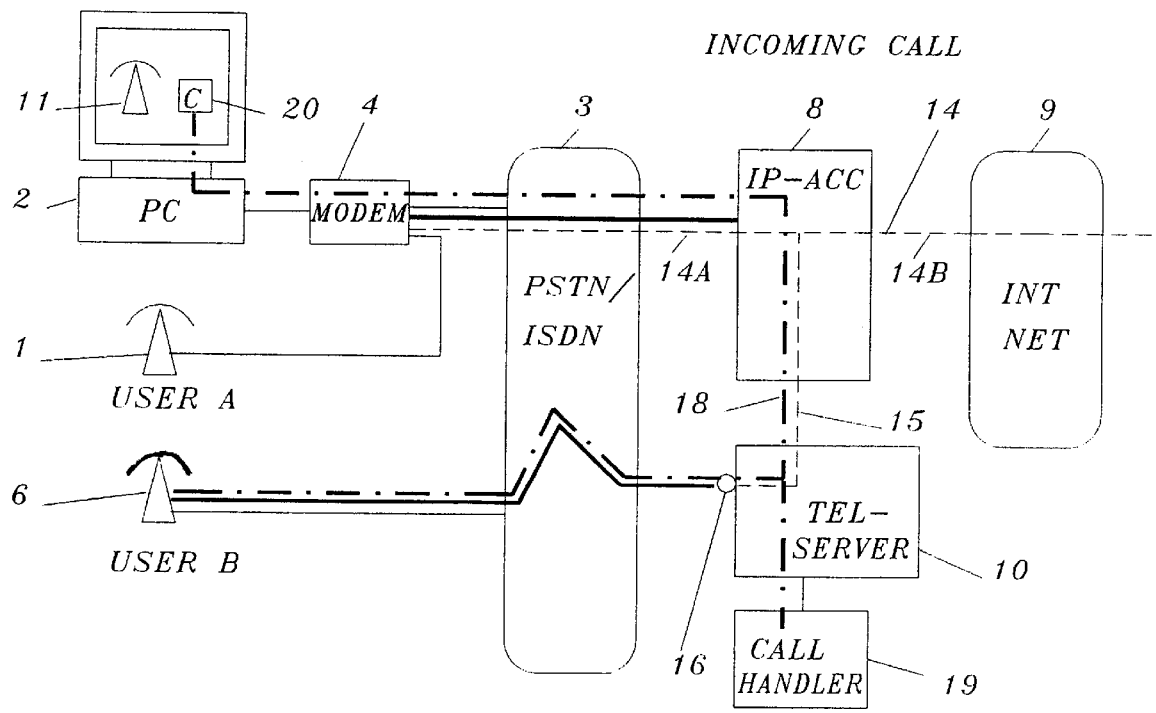
FIG. 2 is a block diagram similar to FIG. 1; the telephony server handling an incoming call in a slightly different way.

In FIG. 2 alternative (b) is shown. In response to the alert, user A sends a request to the telephony server. The request is sent by the telephony application and orders the telephony server to take the incoming call and to connect it to a call handling agent. The call handling agent is a distributed entity, one part 19 thereof being part of or connected to the telephony server, another part 20 thereof being connected to the called user's computer. An example of a call handling agent is an electronic secretary having voice prompting facilities, another example is a voice mail box. An example of a service provided by the call handling agent is redirection of the incoming call to another telephone number or to another facility.

In alternative (c) the telephony server rejects the call without answering it.

When the conversation between A and B is finished the call is terminated. The telephony server releases the second relation between the incoming call and IP address of the called user's computer.

Outgoing call

Figure 3:
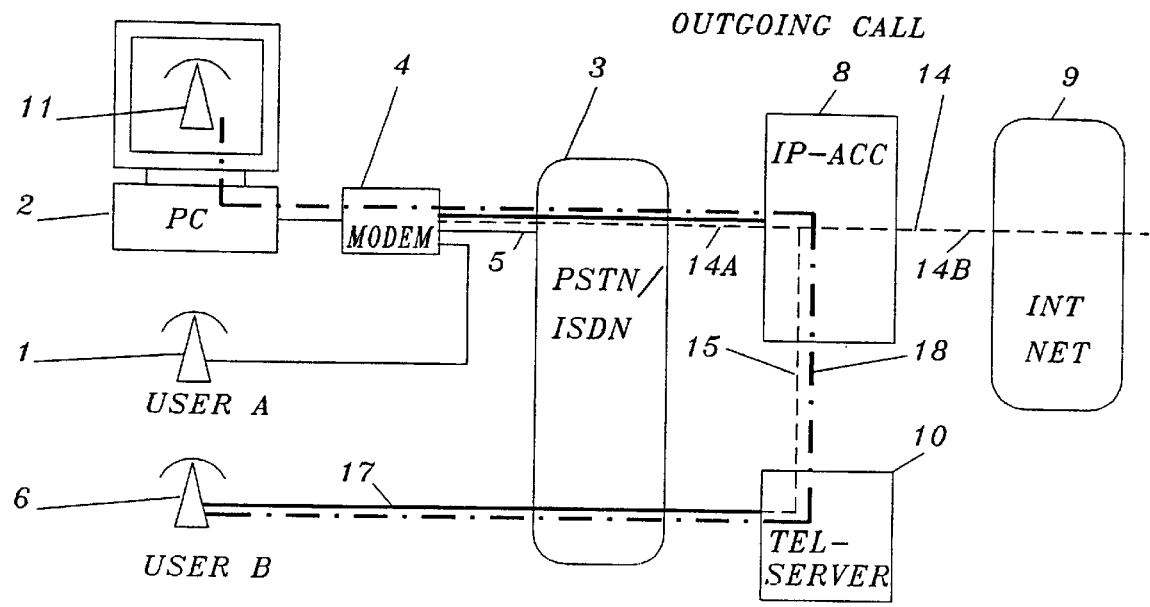
FIG. 3 is a block diagram similar to FIG. 1; the telephony server handling an outgoing call from an Internet user to a telephone user.

In FIG. 3 an outgoing call from user A is shown. It is supposed user A has an ongoing IP session with the Internet and that user A wants to place an outgoing call. As described above in connection with start up of the telephony application the IP access server has associated a unique IP address to user A's computer and has set up IP packet paths 14A, 15 to the telephony server. User A enters the telephone number to call on the keyboard of the personal computer and requests the telephony application to initiate an outgoing call. In response to said request the telephony application in its turn requests the telephony server to place an outgoing call to the requested number. Said latter request together with the requested telephone number is sent to the telephony server over the IP packet paths 14A, 15.

The telephony server selects an outgoing line to the PSTN and dials the requested number. The called party answers. A PSTN connection, symbolically shown at 17 in FIG. 3, is set up to the called party, user B in the example. Next, speech information is exchanged between the telephony server and the telephony application via the IP access server using the IP packet paths 14*a*, 15. The voice path is labelled 18.

In FIGS. 1, 2 and 3 members of the family of user A can place outgoing calls using the telephony application while there is an ongoing IP session. They also can take incoming calls using the telephony application while there is an ongoing IP session. Typically a modem connection has a bandwidth of 28 kbit/s. Using modern speech coding technique voice transmission requires a bandwidth of only about 10 kbit/s. The rest of the bandwidth available on the PSTN connection 13 can be used for other simultaneously running Internet applications.

Figure 4:
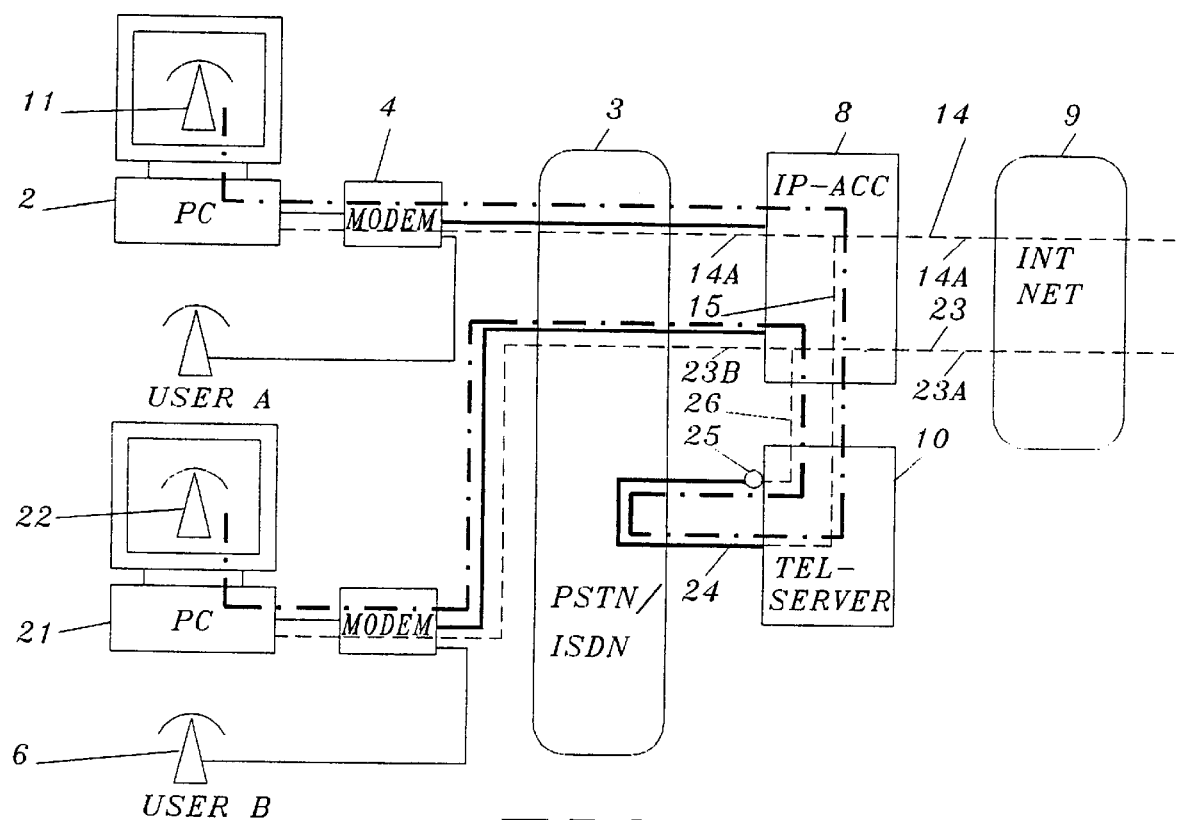
FIG. 4 is a block diagram similar to FIG. 1; the telephony server handling a call between two Internet users.

FIG. 4 illustrates an example where users A and B both have a respective personal computer 2 and 21 respectively. Each computer is provided with a respective telephony application 11 and 22. Both users are engaged in a respective IP session. User B's IP session is using an IP packet path 23 comprising two parts 23A and 23B. Both users will therefore also have their respective call forwarding service activated. Suppose user A wants to make an outgoing call, using his telephony application, to user B. Using the method for an outgoing call described above the telephony server places an outgoing call, PSTN connection 24, to B using B's telephone number. The PSTN will redirect the call to the telephony server which receives the call at a port 25. The telephony server creates a relation between the incoming call and the called user B and alerts B over IP packet paths 26, 23B. When B decides to take the call, the telephony server will send voice data from A, digitalized, compressed and packetized, in IP packets to the IP access server over the IP packet paths 26, 23B. This completes a connection between A and B.

Service termination

User A requests the telephony application to withdraw. In response to the request the telephony application requests the telephony server to cancel the call forwarding service. Next the telephony server deactivates the call forwarding service in the PSTN. The dynamic relation between user A's telephone number and the IP adress of user A's computer is released.

Figure 5:
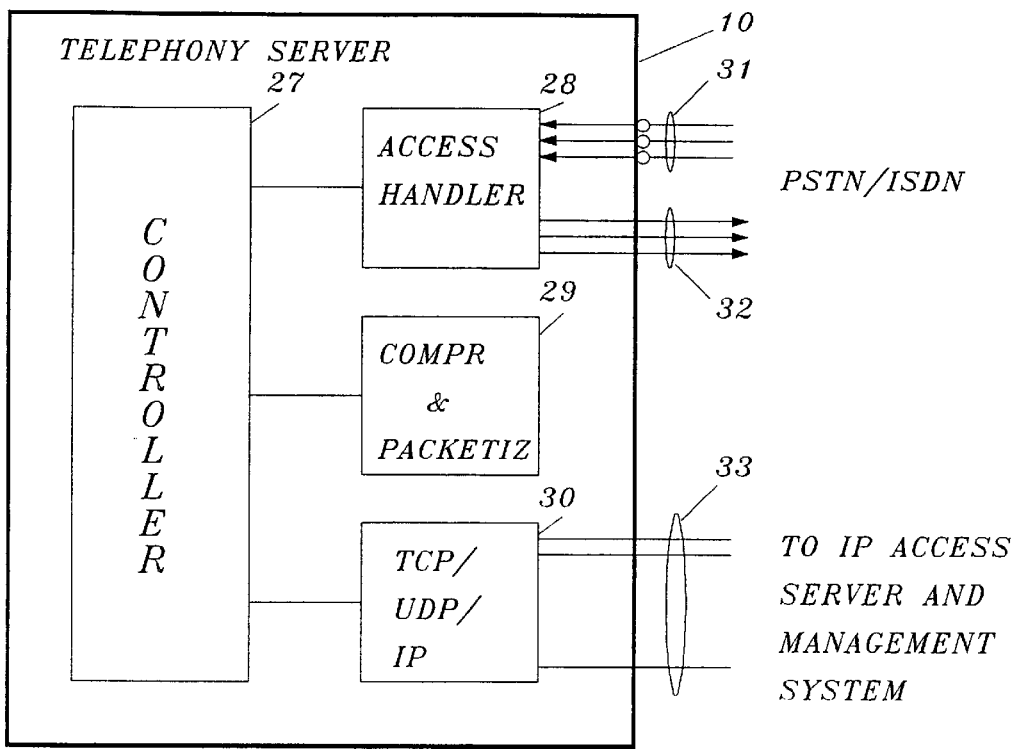
FIG. 5 is a block diagram of the telephony server in accordance with the invention.

FIG. 5 is a block diagram of the telephony server 10 in accordance with the invention. It comprises a central controller 27, an access handler 28, a compression- and packetizing unit 29, an IP access controller 30, incoming and outgoing subscriber lines, 31 and 32 respectively, connected to the PSTN network and a number of lines 33 connected to the IP access server 8. Under control from the central controller the access handler receives incoming calls, places outgoing calls, handles the telephone numbers of the telephony server, requests the PSTN network to activate and deactivate the call forwarding service and provides connections to the IP access server. The compression and packetizing unit converts analogue speech signals into digital format, and vice versa, so that they can be subjected to digital processing. The digitized speech signals are sampled using conventional technique and are subjected to compression using conventional speech compression algorithms. Finally the sampled compressed digital signals are organized into packets and sent to the IP access controller. The IP access controller provides the packets with headers and tails and controls the flow of IP packets to and from the telephony server using the TCP (transmission control protocol), the IP (Internet protocol) network layer protocol and the UDP (user datagram protocol) protocol.

The lines 31, 32 are preferably digital lines such as ISDN 30B+D (Primary rate B) or a digital PABX line (Private Automatic Branch telephone exchange). To the telephony server it does not matter whether the telephones 1, 6 are of analogous or digital type, because PSTN/ISDN will provide the proper type of signals to the telephones. The telephony server must however unpacketize the compressed speech and decompress it before it is sent as normal speech information to the PSTN or the ISDN network.

Relating an incoming call to the called Internet user.

In a preferred embodiment of the invention the telephony server has a unique telephone number which is used by many different telephony applications. The telephony server must thus be able to combine an individual incoming call with the IP address of the called Internet user. As described above when an Internet user logs on to the telephony server at start up of the telephony application the IP-address associated with the user's computer is dynamically linked to the user's telephone number in the telephony server. This information is stored by the telephony server. The telephony server will thus have a list of telephone number/IP-address combinations.

To establish the correct relation between an incoming call and the called Internet user the telephony server must be given the destination of the incoming call from the incoming call itself. Several methods are available depending on the capabilities of the network transporting the incoming call. It should be remembered that the incoming call is a call that has been forwarded to the telephony server.

If the network supports the service called A-number transmission, a service that presents to the called party the telephone number of the calling party (using the internationally adopted notation that A makes a call to B; A and B not being the same identities as used in the examples given in the specification), then the number presented as A-number identity to the telephony server will be the telephone number that forwards the call, referred to as the call forwarding number. In this case the call forwarding number is the telephone number to the called user. Accordingly the incoming call will present to the telephony server the telephone number to the called Internet user. Given this number the telephony server looks into its list. In the list it will find a matching telephone number/IP-address combination. Thus a relation is created between the incoming call and the called user's IP address.

In the future it is foreseen, quite independently of the present invention, to change the line protocol containing the A-number identification so that it presents to the called party both the real destination address and the address to which forwarding is taking place.

An alternative method of establishing the relation between an incoming call and the IP address of an Internet user is possible if the telephony server is connected to the PSTN or ISDN via an interface, such as a PABX interface, allowing for several numbers to be associated with the telephony server. In this case the telephony server will assign a unique telephone number to the user when the user starts the telephony application, and will release the assigned number when the telephony application is terminated. The released telephone number can then be used by another user that logs on to the telephony server. The relation between a user's IP address and said selected number of the telephony server is stored in a table.

For an incoming call, the destination number of the telephony server to which the call is redirected is known to the telephony server, and the corresponding IP address to the user's telephone is derived from the above mentioned table.

Call forwarding

As an example how the call forwarding service is activated by the telephony server on behalf of an Internet user A the telephony server uses the known service called remote controlled call forwarding. How this is done is explained with reference to FIG. 7. In FIG. 7 a management system 37 of the PSTN network has connections 38 to the PSTN and TCP/IP connections 39 to the IP access server 8. To activate the remote controlled call forwarding service the telephony server sends the above mentioned request for forwarding of calls to the telephony server using a TCP/IP connection 39. The telephony server states the selected telephone number and the Internet user's home telephone number. In response to this request the management system activates the forwarding service with respect to the user's home telephone number. To deactivate the forwarding service the telephony server sends another request to the management system.

Another method to activate and deactivate the remote controlled call forwarding service is that the telephony server in case of a PSTN network dials, or in case of an ISDN network signals on the D channel, (1) an access code to the remote controlled call forwarding service, (2) the selected number to the telephony server, or the unique number to the telephony server, and (3) the home telephone number of the Internet user. This method requires that the line protocol of the PSTN or ISDN network supports that the remote controlled call forwarding service can be activated and deactivated from the telephony server. To activate and deactivate the service the telephony server needs to signal a pass word to the PSTN/ISDN network for security reasons.

Still another method to activate and deactivate the call forwarding service is to request this service from the user's computer before the user connects the computer to the Internet.

Mobility

In accordance with a modified embodiment of the invention the telephony application, when establishing contact with the telephony server, has to follow an authentication procedure, the purpose of which is to establish the identity of the user and the telephone number/telephone line from which the user is having the ongoing Internet session. As an example the telephony server prompts the user or the user's telephony application to give a password and the telephone number at which the Internet session takes place. In accordance with this modified embodiment user A can have the IP session from any telephone line connected to the PSTN, thus imparting mobility to user A, while calls to user A's home telephone will be redirected to the site at which user A is having the Internet session.

Modifications

In the above description user A has access to the Internet access server via the modem and the public switched telephone network PSTN. Within the realm of the present invention a user can access the Internet access server via an integrated service digital network ISDN or other available network such as a mobile telephone network.

The telephony server can be equipped with a fax handling unit. If user B sends a fax to user A while user A's telephone number is redirected to the telephony server the telephony server will receive the call. The telephony server probes the voice channel for a modem tone that characterizes the transmission from a fax machine. When said tone is detected the telephony server redirects the call to its fax handling unit and informs user A of an incoming fax. The fax handling unit establishes the connection with the sending fax machine and receives the fax. The fax handling unit stores the received fax as an image file. At a time suitable for user A, user A retrieves the fax as a file over the IP link. Using a conventional fax application the fax is displayed on user A's PC or is printed on a printer connected to the PC. In the alternative the fax handling unit can send the fax image file to user A as an Email. In a similar fashion user A can send a fax while the Internet session is active.

A computer connected to the ISDN network will have no modem between its serial port and the ISDN terminal. The computer is connected either directly or via a terminal adapter to ISDN.

The invention has been described in connection with a modem that supports transmission of voice and data serially. Today there are modern modems supporting DSVD (Digital Simultaneous Voice and Data or digital SVD) technique. DSVD modems can transmit both voice and data at the same time on the same line. If user A connects to the IP access server from a DSVD modem and the IP access server supports DSVD voice information between the telephony server and user A can in the alternative be transferred over a voice channel between the telephony server 10 and the IP access server 8, and over the voice channel of the DSVD modem from the IP access server to user A.

The computer's sound capabilities may be realized on the computer's mother board in which case no separate sound card is required.

In FIG. 4 users A and B are handled by the same IP-access server and the same telephony server. In the alternative users A and B are served by different IP access servers and different telephony servers.

The telephony server has been described as being co-located with the IP access server. By this is meant that the telephony server shall have such good connections with the IP access server that it can be regarded as standing in the same cabinet or the same room as the IP access server although in reality it is standing at a different place or in a different room.

The way in which call forwarding is activated and deactivated by the telephony server may be varied and depend on the capabilities of the existing telephone network. Instead of letting the telephony server insruct the PSTN to ac-tivate/ deactivate the call forwarding service user A can do it.

What is claimed is:

1. A method of providing a telephone service to a subscriber which has an ongoing Internet Protocol (IP) network session over a first IP link established in a public or private communication network, said first IP link extending between a data communication device at a current location of the subscriber and an Internet access server at a site of an Internet gateway node, said data communication device being connected to a data terminal equipment at said current location of the subscriber, said data terminal equipment having a telephony application allowing for voice transmission over a second IP link, the method comprising the steps of:

providing a telephony server able to communicate with a telephony network and via the Internet access server with the telephony application, wherein the telephony server is able to exchange IP packets with the telephony application in the data terminal equipment over the second IP link via the Internet access server and the telephony server is provided by a first entity that is independent of a second entity that provides the Internet access server to which the subscriber connects;

redirecting a call to the telephony server, using a telephone number of the subscriber as an identification of a destination for the call; and connecting the redirected call with the subscriber at said data terminal equipment via the Internet access server using said second IP link.

2. The method of claim 1, wherein the telephony application logs on to the telephony server.

3. The method of claim 2, wherein the telephony application sends information that comprises an identity of the subscriber and an IP address of the subscriber's data terminal equipment to said telephony server via said second IP link.

4. The method of claim 3, wherein
   (a) the telephony server, in consequence of said redirection, receives an incoming call to the subscriber;
   (b) the telephony server establishes a relation between the incoming call and the IP address of the subscriber's data terminal equipment, using number information available in the incoming call and in said information sent from said telephony application,
   (c) the telephony server alerts, via the Internet access server, the subscriber's telephony application of the incoming call.

5. The method of claim 4, wherein in response to said alert, the subscriber, via the telephony application, instructs the telephony server to take the call, and the telephony server performs said step of connecting the redirected call with the subscriber, using said relation.

6. The method of claim 4, wherein in response to said alert the subscriber decides that the incoming call shall be redirected to a call handling agent, and the telephony server initiates redirection of the incoming call to the call handling agent using said relation.

7. The method of claim 3, wherein an outgoing call from the subscriber initially is made in a manner known per se in that the subscriber enters a number to call and requests the telephony application to initiate the call; the telephony application requests the telephony server to initiate the call to the requested number, the telephony server selects an outgoing line and initiates the call in the public network, the called party answers the call and voice information is exchanged between the telephony server and the telephony application as compressed audio transported over the second IP link and the call is terminated and charged.

8. The method of claim 2, wherein the telephony application logs off from the telephony server and cancels the redirection of calls to the telephony server.

9. The method of claim 3, wherein the telephony server initiates an authentication process the purpose of which is to identify the subscriber and to receive the subscriber's telephone number that is used as the destination identification for the call redirected to the telephony server, thus allowing the subscriber to take calls to the subscriber's telephone while the subscriber is having the Internet session at another terminal equipment connected to the telephony server by other means than using the subscriber's own telephone line.

10. A telephony server for providing telephony service to an Internet user, comprising a central controller connected to an access handler, a voice compression and packetizing unit and an IP access controller, incoming and outgoing telephone lines connected to the access handler, and lines including at least one IP link connected to the IP access controller and adapted to be connected to an Internet access server, wherein the telephony server is able to exchange IP packets with the Internet user via the Internet access server and the telephony server is provided by a first entity that is independent of a second entity that provides the Internet access server to which the Internet user connects using a first IP link, wherein the telephony server exchanges IP packets with the Internet user over a second IP link.

11. A telephony server in accordance with claim 10, characterized by a fax handling unit.

12. The method of claim 2, wherein said telephony application orders the telephony server to activate the service call forwarding in the telephony network, and the telephony server is given as destination for an incoming call to the subscriber.

13. The method of claim 1, wherein the subscriber activates the service call forwarding in the telephony network and the telephony server is given as destination of an incoming call to the subscriber.

14. The method of claim 1, wherein the telephony server has an IP address that is different from an IP address of the Internet access server to which the subscriber connects.

15. The telephony server of claim 10, wherein the telephony server has an IP address that is different from an IP address of the Internet access server to which the subscriber connects.

16. A method of providing a telephone service to a subscriber having an ongoing Internet Protocol (IP) network session over an IP link, the method comprising the steps of:
    establishing a first IP network session at a subscriber location between a data communication device and an Internet gateway node over a corresponding first IP link;
    establishing a second IP network session at the subscriber location independent of the first IP network session, the second IP network session being established between the data communication device and a telephony server over a corresponding second IP link;
    redirecting a call over a telephony network to the telephony server, using a telephone number of the subscriber as an identification of a destination for the call; and
    connecting the redirected call with the subscriber by exchanging IP packets of call information between the telephony server and the data communication device over the second IP link, wherein the redirected call is extracted from the call information at the subscriber location using a telephony application executing on data terminal equipment coupled to the data communication device.

17. The method of claim 16, wherein the telephony application logs on to the telephony server upon establishing the second IP network session.

18. The method of claim 17, wherein the telephony application sends information that comprises an identity of the subscriber and an IP address of the subscriber's data terminal equipment to said telephony server via said second IP link.

19. The method of claim 18, wherein
    (a) the telephony server, in consequence of said redirection, receives an incoming call directed to the subscriber;
    (b) the telephony server establishes a relation between the incoming call and the IP address of the subscriber's data terminal equipment, using number information included in the incoming call and information sent from said telephony application; and
    (c) the telephony server sends an alert, via the call information exchanged over the second IP link, alerting the subscriber's telephony application of the incoming call.

20. The method of claim 19, wherein in response to said alert, the subscriber, via the telephony application, instructs the telephony server to take the call, and the telephony server performs said step of connecting the redirected call with the subscriber, using said relation.

21. The method of claim 19, wherein in response to said alert the subscriber decides that the incoming call shall be redirected to a call handling agent, and the telephony server initiates redirection of the incoming call to the call handling agent using said relation.

22. The method of claim 18, wherein an outgoing call from the subscriber location is made by entering a number to call and requesting the telephony application to initiate the call; the telephony application requests that the telephony server initiate the call to the requested number; the telephony server selects an outgoing line and initiates the call in the public network; the called party answers the call and voice information is exchanged between the telephony server and the telephony application as compressed audio transported over the second IP link; and the call is terminated and charged.

23. The method of claim 17, wherein the telephony application logs off from the telephony server and cancels the redirection of calls to the telephony server.

24. The method of claim 18, wherein the telephony server initiates an authentication process the purpose of which is to identify the subscriber and to receive the subscriber's telephone number that is used as the destination identification for the call redirected to the telephony server, thus allowing the subscriber to receive calls made to the subscriber's telephone line while the subscriber is engaged in an IP network session at another data terminal equipment connected to the telephony server by means other than using the subscriber's own telephone line.

25. The method of claim 17, wherein said telephony application orders the telephony server to activate the service call forwarding in the telephony network, and the telephony server is given as destination for an incoming call to the subscriber.

26. The method of claim 16, wherein the subscriber activates the service call forwarding in the telephony network and the telephony server is given as destination of an incoming call to the subscriber.

27. A telephony server for providing telephony service to an Internet user, comprising a central controller connected to an access handler, a voice compression and packetizing unit and an IP access controller, incoming and outgoing telephone lines connected to the access handler, and lines including at least one IP link connected to the IP access controller and adapted to be connected to an Internet access server, wherein the telephony server is capable of exchanging IP packets of call information between an Internet user coupled to an Internet gateway node via the Internet access server by a first IP link and a telephony server, the IP packets of call information being exchanged over a second IP link established independently of the first IP link by the Internet user.

28. The telephony server of claim 27, further comprising a fax handling unit.

29. The telephony server of claim 16, wherein the telephony server has an IP address that is different from an IP address of the Internet access server to which the subscriber connects.

30. The telephony server of claim 27, wherein the telephony server has an IP address that is different from an IP address of the Internet access server to which the subscriber connects.

* * * * *